Patented Apr. 7, 1931

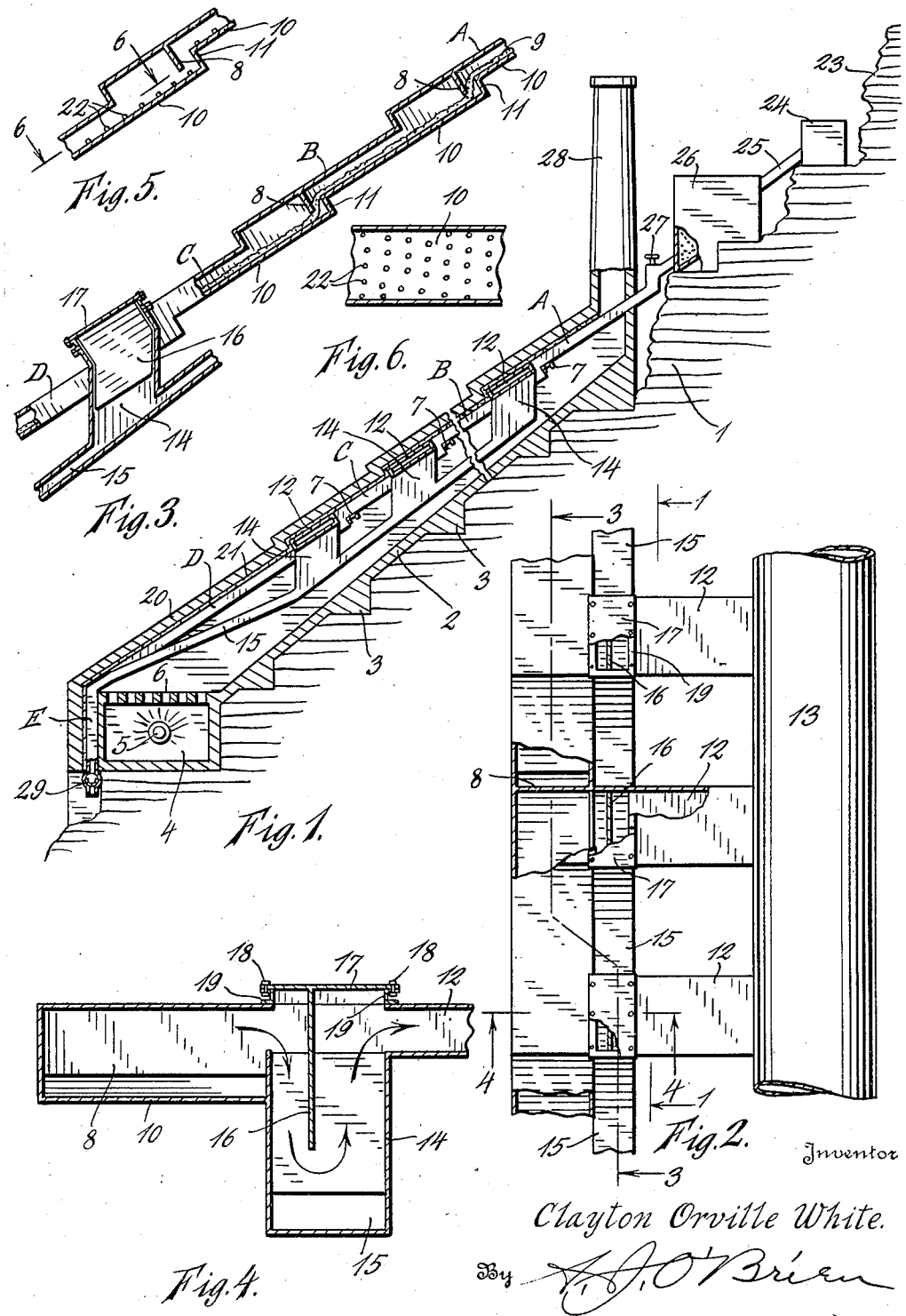

1,799,268

UNITED STATES PATENT OFFICE

CLAYTON ORVILLE WHITE, OF DE BEQUE, COLORADO

SHALE RETORT

Application filed January 23, 1928. Serial No. 248,909.

This invention relates to improvements in oil shale retorts of the type shown and described in my copending application Serial No. 221,973, now Patent No. 1,703,413, filed September 26, 1927, and has reference more particularly to the addition of a dust separator to retorts for the treatment of oil shale, regardless of their specific construction.

In the treatment of oil shale for the purpose of removing the hydrocarbon content, the shale is subjected to heat within a closed chamber. This heat is of sufficient value to "cook" the shale so as to volatilize the hydrocarbon constituents. The volatiles that result from the retorting of the shale are removed from the retort through take-off conduits which extend to suitable condensers located adjacent to the retort. When the gases are removed in this manner, they invariably carry a large amount of dust and small particles of shale which if not removed are transported to the condenser and settle to the bottom or float in the oil making the oil gummy and dirty. The larger particles of dust settle to the bottom of the tank and makes it necessary to clean the tanks quite frequently, while the smaller particles remain mixed with the oil.

It is the object of this invention to provide a dust separator in each of the gas takeoffs, so that the dust particles will be removed from the gas which will therefore enter the condensers in a comparatively clean state, thereby producing a better grade of oil and making it unnecessary to clean the condensers and storage tanks as frequently as must be done in the absence of dust separators.

It is another object of this invention to locate the dust separators within the heated chamber that contains the retort proper so that the dust after it has been separated will be subjected to sufficiently high temperatures to remove all the volatile constituents.

In order to explain my invention, I have illustrated the same as applied to a shale retort of the specific construction disclosed in my copending application above identified, and reference will now be had to the accompanying drawing in which the preferred embodiment has been illustrated and in which:

Fig. 1 is a longitudinal vertical section taken on line 1—1, Fig. 2, and shows the position of my retort together with the dust collectors within the heated chamber of the furnace;
Fig. 2 is a top plan view of a portion of the retort, parts thereof being broken away so as to better disclose the construction;

Fig. 3 is a section taken on line 3—3, Fig. 2;

Fig. 4 is a section through one of the dust separators, taken on line 4—4, Fig. 2;

Fig. 5 is a fragmentary section similar to that shown in Fig. 3 and illustrates a slightly modified construction; and Fig. 6 is a section taken on line 6—6, Fig. 5.

In the drawing numeral 1 represents an oil shale deposit along the inclined surface of which the retort has been constructed. The retort comprises a furnace chamber having a bottom 2, which may be of fire brick or other refractory material. This is anchored to the side of the hill by means of steps 3 which are set into the hillside in the manner indicated. At the bottom of the furnace is a chamber 4 within which is located the gas burner 5 by means of which the heat is produced. Chamber 4 has a top formed from a reticulated wall of fire brick which has been indicated by numeral 6. Supported on suitable transverse supporting members such as the channels 7 is a retort chamber which, in the embodiment illustrated, is constructed in the manner shown and described in my copending application above identified, and which consists of a plurality of sections A, B, C and D which are formed from steel plates and have a rectangular transverse section and which are provided with flat inclined bottoms. At the end of each section is a downwardly extending baffle plate 8, which serves as a retarding means for the oil shale 9 in its descent through the retort. At the place where the baffles 8 are located, the bottom 10 is stepped downwardly and lies in a plane somewhat below the plane of the bottom of the section directly above. The bottom sections are jointed by means of angular end walls 11 which are located a short distance above the baffle plate 8. As the shale flows downwardly over the flat bottoms under the influence of gravity, it strikes a baffle plate 8 and has its velocity arrested and then falls upon the bottom section 10 below the baffle 8 where it again takes up its flow and increases its speed under the influence of the acceleration of gravity. The action of these baffle plates is therefore to cause a periodic retardation of the velocity and by increasing or decreasing the number of sections in the retort the speed can be decreased or increased to any extent desired. This construction therefore makes it possible to greatly increase the time that it requires for the powdered shale to pass through a retort of a given length. This construction has been described and claimed in my copending application above identified and will therefore not be further enlarged upon in this specification.

At points directly below the baffle plates 8, the retort is provided with off-take pipes or conduits 12, which extend laterally and connect with the condenser 13, in the manner shown in Fig. 2. If these off-take pipes extend in a straight line from the retort to the condenser, the gases and vapors will flow through them at a very high velocity and will carry along small dust particles which will settle in the bottom of the condenser 13, or which will remain suspended in the oil giving the latter a dirty appearance and causing it to become gummy and sticky. For the purpose of separating the dust from the gas I have provided each of the off-takes with a dust separator. These separators consist of a separating chamber such as that illustrated in Fig. 4 and which has been indicated by reference numeral 14. The lower ends of these chambers open into a conduit 15 which extends downwardly to the bottom of section B where it is joined with the latter. A partition 16 is welded to a cover 17 and extends into the dust compartment 14 terminating a short distance above the conduit 15 in the manner shown quite clearly in Figs. 3 and 4. The gas in passing from the main retort to the take-off conduits 12, follows the path indicated by the arrows in Fig. 4. In passing downwardly the dust particles will be given a high velocity and as these particles have a greater specific gravity than the gas, they will acquire a greater momentum and this momentum will carry them downwardly into the conduit 15, while the gas, which is much lighter will turn upwardly and pass into the take-off pipes 12. The dust particles which are thus separated from the gas will be deposited as above mentioned on the bottom of conduit 15 and as this is located in the heated chamber that contains the main retort these particles will be subjected to a high temperature, which will remove any unvaporized hydrocarbon and the dust will therefore become a dry powder which will flow downwardly into the discharge section E of the retort. The gases and vapors that are separated from the dust by means of the heat pass upwardly and enter the take-off conduits 12 and are finally delivered to the condenser 13.

I want to call particular attention to the importance of having the dust separators in the heated chamber or subjected to a high temperature for the reason that if the dust separators were located outside of the furnace chamber, the unvaporized hydrocarbons carried by the dust would cause the same to accumulate and would soon fill up the separator compartments. Whereas, when these separator compartments are located in a highly heated zone the hydrocarbons will be driven off and the resultant dry dust will then be at liberty to flow downwardly through the conduit 15.

Covers 17 are preferably removably secured by means of bolts 18 to the channels 19, in the manner illustrated in Fig. 4. If for any reason it should be necessary to remove these covers so as to clean the interior of the separator chambers, and the conduit 15, this can readily be accomplished by removing the bolts 18 whereupon the covers and partition 16 can be readily removed.

Attention is now directed to Fig. 1 from which it will be seen that the top of the furnace chamber which has been indicated by numeral 20 is separated from the upper surface of the retort by a sheet of asbestos which has been designated by numeral 21. By this construction the upper surface of the retort is protected from the intense heat to which the lower side is subjected, and therefore the liberated gases which naturally travel in contact with the upper surface will not be subjected to sufficient heat to burn them. The gases will therefore produce a clearer condensate than if they were subjected to an excessive heat after the liberation from the shale. Where retorts of this type are subjected on all sides to the high temperature of the furnace, the resultant product is darker and therefore less desirable than when care is taken to prevent the burning of the gases.

It sometimes happens that it is desirable to retard the progress of the powdered shale without increasing the number of sections and when this is the case, it can be accomplished by the means shown in Figs. 5 and 6, wherein the bottom section 10 has been illustrated as provided with the plurality of upwardly extending pegs or projections 22, which are longitudinally staggered in the manner shown in Fig. 6. When these projections are provided the shale upon encountering them will be separated into distinct streams and these again be further subdivided by the pegs immediately below, and in this manner a retardation will be effected as well as stirring or mixing of the shale which makes it possible to flow a thicker layer than when these pegs are dispensed with.

In Fig. 1 the place where shale is mined has been indicated by reference numeral 23, while 24 indicates the crusher. From the crusher a conduit 25 extends to a storage bin or hopper 26, which is connected to the upper end of section A by a conduit having a valve 27. Numeral 28 designates the smokestack through which the products of combustion escape. Numeral 29 indicates the discharge valve through which the spent shale is permitted to flow outwardly from the retort. The rate at which the shale is permitted to leave the retort must be greater than the rate at which shale is admitted so as to prevent an accumulation of shale within the retort.

The shale before it is admitted to the retort is ground to a fine powder and the bottom of the retort is inclined at such an angle that this powdered shale will flow by the action of gravity alone. The bottom sections 10 are flat in a transverse direction and therefore the shale will spread evenly over the flat surface. In order to get the best results the thickness of the layer of shale should be approximately an eighth of an inch in order that all the shale particles can come in direct contact with the heated metal bottoms. This thin flat layer of powdered shale flowing in a continuous stream gives the retort a very large capacity and since the shale particles are always moving, there is no gumming taking place and consequently the retort will always remain clean.

I want to call particular attention to the great difference in operation between a retort of this type and retorts which are inclined and from which the shale is permitted to discharge slowly as in the latter case the retort is always filled with shale which forms a solid mass that flows slowly under the action of gravity. In my retort there is only a thin layer of shale on the bottom and this is flowing at a high rate of speed which is interrupted at intervals by the baffle plate 8.

In the above description the dust separators have been shown and described in connection with a specific form of retort but I want it distinctly understood that separators of this type are equally useful and can be employed in connection with shale eduction retorts of any type, and I therefore intend to claim this combination as broadly as the art permits.

Attention is also called to the fact that the separators are located within the heated chamber of the furnace, as thereby much better results are obtained than if the separators were not heated to a high degree. It is, of course, possible to locate the separators within another furnace and heat them separately, but as this would complicate the construction and have no advantage it has not been shown.

From the above description it will be apparent that I have produced a device of simple construction by means of which the dust can be separated from the gases and vapor before they enter the condensers, thereby producing a product which is of a better appearance and which can be more easily handled and treated than if the dust were not separated.

Having described the invention what is claimed as new is:

1. A retort for the treatment of oil shale comprising a plurality of interconnected sections, each having a flat bottom, the bottom surface of each section being inclined at an angle greater than the angle of repose for powdered oil shale whereby oil shale will flow by the action of gravity alone, means located at the juncture of each of the sections for changing the direction of flow of the shale whereby the velocity is reduced, a gas take-off conduit connected with the interior of the retort directly below each velocity reducing device, a dust separator in each conduit, and means for heating the retort sections and the corresponding dust separator to substantially the same temperatures, whereby condensation will be prevented in the dust separators.

2. A retort for the treatment of oil shale comprising a plurality of interconnected sections, each having a flat bottom, the bottom surface of each section being inclined at an angle greater than the angle of repose for powdered oil shale whereby oil shale will flow by the action of gravity alone, means located at the juncture of each of the sections for changing the direction of flow of the shale whereby the velocity is reduced, a gas take-off conduit connected with the interior of the retort below each velocity reducing device, a dust separator in each conduit and means for transferring the dust from the dust separators to the retort adjacent the lower end of the latter.

3. A retort for the treatment of oil shale comprising a plurality of interconnected sections, each having a flat bottom, the bottom surface of each section being inclined at an angle greater than the angle of repose for powdered oil shale whereby oil shale will flow by the action of gravity alone, means located at the juncture of each of the sections for changing the direction of flow of the shale whereby the velocity is reduced, a gas take-off conduit connected with the interior of the retort below each velocity reducing device, a dust separator in the takeoff conduit and an inclined conduit connected with the lower end of each dust separator for conducting dust from the separators to a compartment.

In testimony whereof I affix my signature.

CLAYTON ORVILLE WHITE.